United States Patent [19]

Fujimoto

[11] 4,325,725
[45] Apr. 20, 1982

[54] APPARATUS FOR PRODUCING GLASS BOTTLES

[75] Inventor: Masami Fujimoto, Nishinomiya, Japan

[73] Assignee: Yamamura Glass Kabushiki Kaisha, Nishinomiya, Japan

[21] Appl. No.: 194,905

[22] Filed: Oct. 7, 1980

[51] Int. Cl.³ ............................................. C03B 9/44
[52] U.S. Cl. ...................................... 65/230; 65/232; 65/235; 65/260
[58] Field of Search .................. 65/230, 232, 235, 260

[56] References Cited

U.S. PATENT DOCUMENTS 4,255,177 3/1981 Fenton .............................. 65/230 X
4,255,179 3/1981 Foster ............................... 65/230 X Primary Examiner—Arthur D. Kellogg
Attorney, Agent, or Firm—Holman & Stern

[57] ABSTRACT

An apparatus comprising a parison forming assembly and a final shaping assembly each having a mold, and a reheating and intermediate forming assembly provided between the two assemblies and having a cover or an intermediate forming mold for enclosing the parison in a confined space, the assemblies being associated with one another for sequential operation. Without prolonging the molding cycle time usually needed for the parison forming assembly and the final shaping assembly, unfinished parisons can be reheated sufficiently.

3 Claims, 6 Drawing Figures

APPARATUS FOR PRODUCING GLASS BOTTLES

BACKGROUND OF THE INVENTION

The present invention relates to an apparatus for forming gobs supplied from a feeder into bottles of specified finished shape.

Heretofore known as such apparatus are so-called I.S. machines for forming bottles, as disclosed in U.S. Pat. No. 1,911,119. Because of their production efficiency and economy, I.S. machines are widely used in the bottle making industry. I.S. machines include sections each comprising a mold for forming a gob into an inverted parison, a mouth mold for forming the mouth of the bottle to a finish while forming the parison, a finishing mold for shaping the parison to a finished bottle in the normal proper position, inverting assembly supporting the mouth mold and turnable through 180 degrees in a vertical plane for transferring the inverted parison to the finishing mold in the proper position, etc. Gobs are supplied in a predetermined order from a feeder to the parison forming molds of the sections, in each of which the above-mentioned components operate in specified sequence to form glass bottles. The glass bottles molded in the sections are transferred one after another onto a common conveyor as aligned in a continuous row at substantially equal spacing.

Suitable molding processes in this case are the press blow process (PB process) which is chiefly used for forming wide-mouthed bottles and in which the parison is formed by pressing, followed by blow molding for finishing, and the blow blow process (BB process) which is used mainly for forming small-mouthed bottles and in which parison forming and finishing are both done by blowing. Since bottles made by the PB process are uniform in wall thickness and advantageous in strength and can be made lightweight, attempts have been made to mold bottles with small mouths also by the PB process.

When small-mouthed bottles are to be formed by the PB process, the parison must be held with its surface separated from the mold so that although the parison has been deprived of heat from its outer surface by contact with the mold, the parison can be reheated with its own internal heat to render the glass material smoothly stretchable for uniform shaping by the finishing step. With conventional I.S. machines, however, the parison formed by a mold is merely released therefrom by opening the mold, that is, by removing the mold which cools the surface of the parison, and the parison is reheated as mentioned above. Thus the parison surface is reheated by the internal heat while being exposed to the atmosphere, which tends to remove heat from the parison surface. This leads to a reduced reheating efficiency, giving rise to the necessity for a prolonged period of reheating to assure satisfactory blow molding for finishing. The time available for reheating is the period of time after the parison forming mold has been opened until the parison is transferred from the parison forming station to the finishing station, and the period of time after the parison has reached the finishing station and before finishing is started. To obtain a sufficient reheating time, therefore, there is the need to prolong the time taken for the transfer of the parison from the forming station to the finishing station, or to delay the start of the finishing operation. In either case, the bottle forming machine must then be operated at a greatly reduced speed. This results in a marked reduction in operation efficiency. Since the parison is transferred with its shaped bottle mouth portion held by the transfer means, a prolonged transfer time will permit the bottle neck portion to markedly bend or stretch due to the gravity acting on the unsupported bottle body portion, consequently causing trouble to the finishing operation.

Further with conventional I.S. machines, the parison or bottle is taken out and transferred to the next step or to a conveyor by a simple takeout comprising a reciprocally pivotally movable arm and tongs attached to the forward end of the arm for supporting the workpiece in suspension, such that the arm is turned through 180 degrees to move the tongs for the transfer of the workpiece. However, because the takeout is adapted to carry the workpiece in suspension with its bottle mouth portion only held by the tongs, an uncooled workpiece, especially a fully reheated and soft parison, is likely to stretch, bend or otherwise deform under gravity or due to inertia, whereas the semicircular path of transfer of the workpiece along which it is substantially moved is about 1.5 times as long as the required distance of travel, and the workpiece must be raised a distance which is one half the required distance of travel. As a result, the parison is liable to deform to a great extent. While being handle automatically, for example, for filling, bottles, if deformed, will contact one another more frequently than usually or strike the filling head, and are therefore susceptible to damage or break.

SUMMARY OF THE INVENTION

The main object of this invention is to provide an apparatus for producing glass bottles which is available easily and inexpensively by modifying a conventional I.S. machine, i.e. by adding a forming station to each of its sections and in which parisons can be sufficiently reheated within the usual molding cycle time and thereby made moldable favorably for finishing to afford glass bottles of high quality.

Another object of the invention is to provide a bottle forming apparatus in which sufficiently reheated parisons or intermediately formed pieces can be fed to the finishing station without permitting substantial stretch, bending or deformation with use of at least one takeout of the arm type having an improved construction in order to afford glass bottles of higher quality.

First, the apparatus of this invention is characterized in that the apparatus comprises parison forming means, reheating and intermediate forming means and final shaping means which are associated with one another for a sequential operation, each of the parison forming means and the final shaping means having a mold which is openable for taking out a parison or a bottle, the reheating and intermediate forming means having a cover or intermediate forming mold which is openably provided for enclosing the parison in a confined space.

Second, the apparatus of this invention is characterized in that at least a takeout for taking out a parison or intermediately formed piece from the reheating and intermediate forming means and transferring the same to the final shaping means comprises an arm pivoted at a point below a line through two points between which the point of support of a workpiece holder on the arm moves for transferring the parison or formed piece.

By virtue of the first feature, the molding cycle time usually needed for the parison forming means and the finishing means of conventional apparatus can be fully utilized for reheating, or for reheating and intermediately forming, the parison by the reheating and intermediate forming means efficiently in a limited space. Thus the parison can be reheated sufficiently without prolonging the usual molding cycle time. Further by virtue of the second feature, the arm of the takeout turns through an angle less than 180 degrees about its pivoted point which is below a line through the two points between which the arm must be moved, with the result that the parison substantially travels over a reduced distance and is raised to a lower level. Consequently, the parison which is entirely very soft by being fully reheated can be effectively prevented from stretching, bending or deformation during transfer due to gravity or inertia.

The foregoing two features assure that parisons which are satisfactory both in heat distribution and in preformed shape are fed to the final shaping means for manufacturing bottles of high quality in good yield. The glass bottle forming apparatus of this invention is available inexpensively by simply modifying a conventional I.S. machine, i.e. by substituting a cover or intermediate forming mold for the mold of its finishing means, providing an additional final shaping means subsequent thereto, and lowering the pivoted point of the arm of at least the takeout for the reheating and intermediate forming means.

Other objects and features of this invention will become apparent from the following description of the preferred embodiment given with reference to the accompanying drawings.

DESCRIPTION OF THE PREFERRED EMBODIMENT

Figure 1:
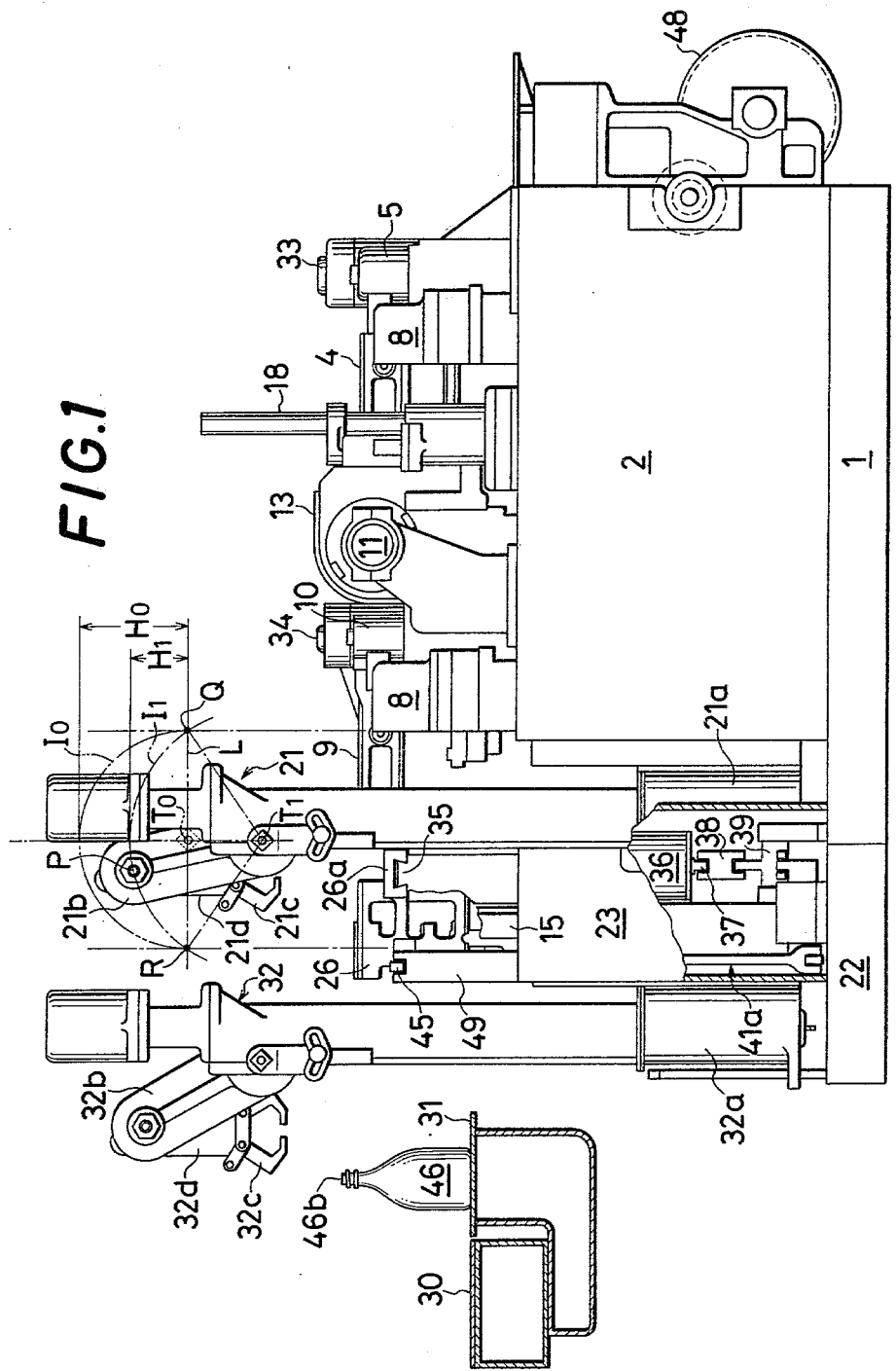
FIG. 1 is a side elevation showing an embodiment of the invention.
Figure 2:
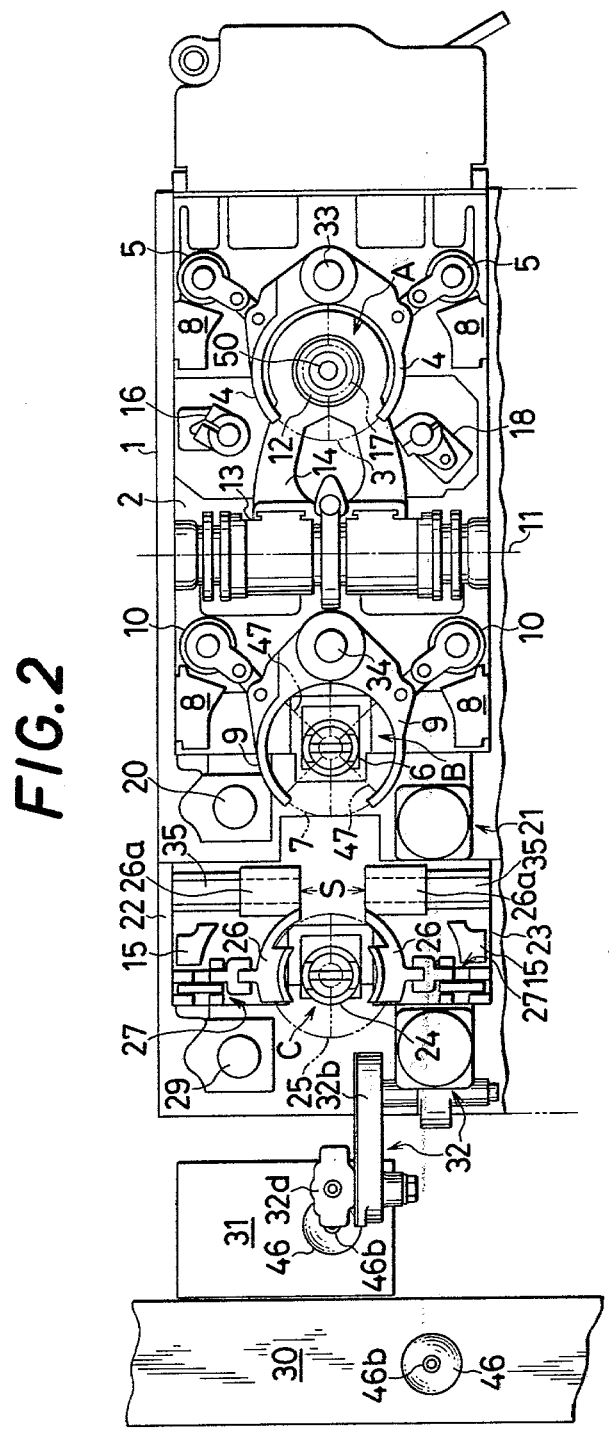
FIG. 2 is a top plan view of FIG. 1 partly broken away and showing a bottle forming section.
Figure 3:
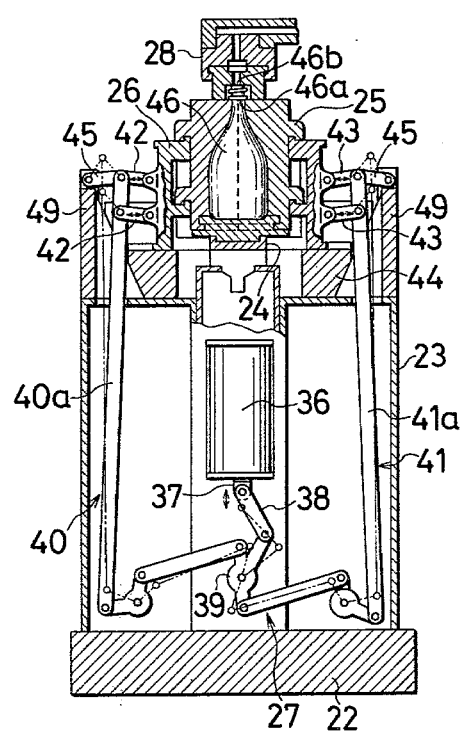
FIG. 3 is a sectional view showing final shaping means.

The embodiment shown in FIGS. 1 to 4 will now be described. A frame 2 on a bed 1 is provided thereon with a parison forming mold 3, holders 4 for holding the mold 3 openably, holder opening assemblies 5 and a plunger 50 cooperative with the mold 3 for forming a parison. These components constitute parison forming means A. Reheating and intermediate forming means B on the frame 2 comprises a support assembly 6 having attached thereto a member for supporting the bottom of the parison or a bottom mold for intermediate forming, a cover 7 for reheating and intermediate forming, holders 9 for openably holding the cover and cover opening assemblies 10 connected to the holders 9. Interposed between the means A and means B is an inverting assembly 13 having a mouth mold holder 14 connected thereto. The holder 14 has a base portion pivoted by a horizontal rod 11 and a forward end carrying a mouth mold 12 and is turnable through an angle of 180 degrees by the assembly 13 to selectively position the mouth mold 12 in an inverted position for the parison forming means A or in a normal proper position for the reheating means B. Air ducts 8 for cooling the mold 3, the cover 7, etc. are disposed on the opposite sides of the means A and B. A funnel drive assembly 16 and a baffle drive means 18 are disposed in the vicinity of the parison forming means A. An unillustrated funnel for receiving gobs from an unillustrated gob feeder and guiding the same to the mold 3 is moved to the gob receiving position with suitable timing by the drive assembly 16. The baffle 17 to be placed on the mold 3 to press the bottom of the inverted parison is so placed by the drive means 18 every molding cycle. A blow head drive assembly 20 and an arm-type takeout 21 are disposed in the vicinity of the means B. A blow molding head 19 (FIG. 6) is positioned on the cover 7 by the assembly 20 for every intermediate forming. After reheating or intermeidate forming, the parison is taken out from the means B and transferred to the means C by the takeout 21.

Most of the foregoing components on the frame 2 are those included in the conventional I.S. machine. The means B is a modification of the conventional finishing means. The cover 7 is substituted for the conventional finishing mold, while the conventional bottom mold is replaced by the parison bottom supporting member or intermediate forming bottom mold. Thus almost all components of the conventional machine are utilized for the present apparatus.

Besides the above modification, a bed 22 is attached to (or made integral with) one end of the bed 1 wherein the means B is located, and final shaping means C is installed on a frame 23 on the bed 22. The final shaping means C comprises a finishing bottom mold support assembly 24, a finishing mold 25, holders 26 for openably holding the mold 25, and assemblies 27 connected to the holder 26 for opening the holders. Like the means B, the means C is provided on its opposite sides with air ducts 15 for cooling the finishing mold. The means C is further provided with a drive assembly 29 for positioning a blow head 28 (FIG. 3) on the finishing mold 25 for the finishing operation, and with an arm-type takeout 32 for taking out a finished bottle from the shaping means C and transferring the same onto a conveyor 30 or to a dead plate 31 beside the conveyor 30.

The final shaping means C can be of exactly the same conventional construction as the means B. However, although the opening assemblies 5, 10 for the means A, B comprise the holders 4, 9 which are turnable about pivots 33, 34, respectively, to open and closed positions, the holders 26 of the means C are straightly movable for opening and closing by being guided by a pair of opposed horizontal guide rails 35 of the assemblies 27 to facilitate the transfer of the reheated or intermediately formed parison from the means B to the means C. Stated more specifically with reference to FIG. 3, the frame 23 houses a cylinder 36 having a rod 37, which is connected by a link 38 to a reciprocally turnable lever 39. The lever 39 is connected to two lever-and-link assemblies 40, 41 including vertical links 40a, 41a, which are connected at their upper ends to the holders 26, 26 by pairs of parallel links 42, 42 and 43, 43. Guide rails 44 for supporting the finishing mold 25 on the frame 23 have on the opposite sides thereof brackets 49, which are connected by links 45 to the upper ends of the links 40a, 41a. Thus the stroke of the cylinder rod 37 reciprocatingly moves the vertical links 40a, 41a between the solid-line position and the phantom-line position in FIG. 3 to move the holders 26 sidewise toward or away from each other along the guide rails 35 and thereby close or open the finishing mold 25.

Figure 4:
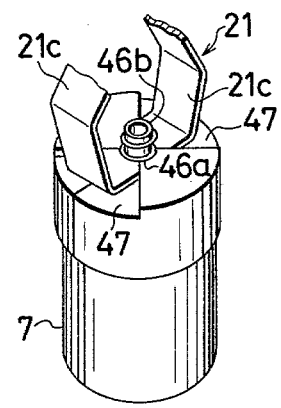
FIG. 4 is a perspective view showing the mouth of a parison as held by tongs.
Figure 5:
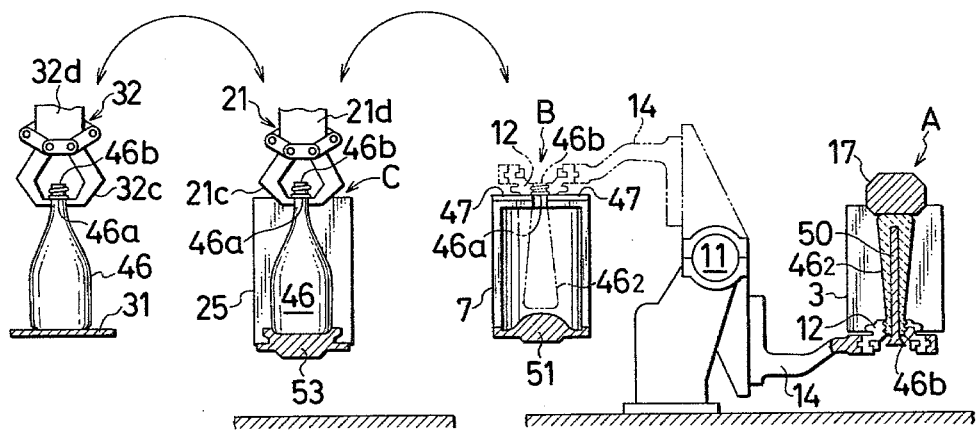
FIG. 5 is a diagram showing a bottle forming process.

The takeouts 21, 32 of the arm type are similar to those already known and used in I.S. machines. Arms 21b, 32b reciprocatingly pivotally movable by cylinders 21a, 32a have suspended from their free ends heads 21d, 32d, respectively, carrying tongs 21c, 32c for holding the workpiece or glass bottle by engagement with a mouth ring 46a on the parison $46_2$ or glass bottle 46. The tongs 21c of the takeout 21 for the means B are illustrated in FIGS. 4 and 5. The tongs ends are so shaped as to engage in sector recesses 47 formed in the top wall of the cover 7 at the opposite sides thereof and to position beneath the mouth ring 46a held in engagement with the cover top wall, the tongs 21c thus being engageable with the ring 46a to carry the reheated parison. Although the parison is held suspended at its mouth portion 46b from the cover 7, the tongs 21c grip the mouth portion 46b of the parison $46_2$ properly and reliably by being guided by the sector recesses 47. The takeouts 21, 32 may be adapted to hold the threaded portion of the parison or bottle.

As is the case with conventional I.S. machines, the means A to C perform, in a predetermined sequence, the operations of: gob→parison→reheating or intermediate forming→final shaping. Accordingly the apparatus is operated full-automatically by the usual control system which employs a conventional timing drum 48 and a valve block (not shown). Although not shown, the control grooves in the timing drum, the valve operating studs to be thereby operated and valves are provided in an increased number corresponding to the addition of the final shaping means C for controlling the operation timing of the components.

As in the prior art, air is supplied to the air ducts 8 from an unillustrated channel through the bed 1 via the interior of the frame 2. Although not shown, air is also supplied to the air ducts 15 extending through the bed 22.

Although the apparatus is adapted for both the BB and PB processes, the operation of the apparatus will be described below for practicing the PB process. The BB process differs from the PB process only in the parison forming step with the mold 3 which step in the BB process is performed in the usual manner.

FIG. 5 shows the bottle forming operation according to the PB process. When the mouth mold 12 is returned to the position of the parison forming mold 3 of the means A, the mold 3 is closed. Simultaneously with the placement of the funnel on the mold 3, the plunger 50 advances into the mold 3 through the mouth mold 12 positioned below the mold 3, to a specified level. In this state, a gob is fed to the mold 3 from the gob feeder through the funnel. After the funnel has been raised, the baffle 17 is placed on the upper opening of the mold 3. The plunger 50 is further raised to the position shown in FIG. 5, whereby the gob is pressed to form a parison $46_2$ in an inverted position within the mold 3. By this time, the mouth 46b of the bottle 46 to be formed is shaped by the mouth mold 12. On completion of the press work, the plunger 50 descends, the baffle 17 rises, and the mold 3 opens. The mouth mold holder 14 thereafter turns about the rod 11 of the inverting assembly 13 with the mold 12 holding the mouth portion 46b of the parison $46_2$, turning the parison from the inverted position to the proper upright position and transferring the same to the reheating and intermediate forming means B as indicated in the phantom lines in FIG. 5.

Figure 6:
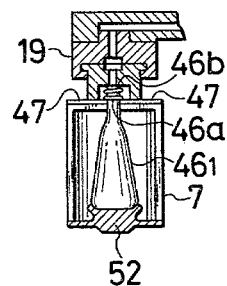
FIG. 6 is a view showing the parison while being reheated and intermediately formed.

With the transfer of the mouth mold 12 and the parison $46_2$ to the means B, the cover 7 closes, and the parison $46_2$ is thereafter released from the mouth mold 12 and held suspended by the cover 7 at its mouth ring 46a. The parison is reheated for a specified period of time. When the parison is to be reheated only, a parison bottom supporting member 51 is attached to the support assembly 6 for preventing the parison $46_2$ from stretching spontaneously more than is allowable during reheating. When the parison is to be reheated and preshaped, a preshaping bottom mold 52 is attached to the assembly 6 as seen in FIG. 6. After the mouth mold 12 has released the mouth portion 46b and has been retracted from above the cover 7 by the return of the holder 14, the blow head 19 is placed on the cover 7 to force a small amount of air into the parison $46_2$ through the mouth 46b and slightly inflate the parison for preshaping, whereby an intermediately formed piece $46_1$ is obtained. The preshaping operation is intended to reduce the degree of deformation needed for finishing the parison so that large bottles or bottles of special shape can be finished with ease and improved accuracy. Since even a simple mode of inflation is advantageous, the preshaping step need not employ a mold that would define the body portion of the parison $46_2$ by preshaping, but merely uses the cover 7 as shown in FIG. 6. The intermediately formed piece $46_1$ inflated by preshaping will not come into contact with the inner surface of the cover 7 that would cool the piece. Thus the parison can be reheated and also preshaped in preparation for the subsequent finishing operation.

After reheating and preshaping, the intermediately formed piece $46_1$ or reheated parison $46_2$ supported by the cover 7 is held by the tongs $21_c$ of the takeout 21 at the mouth ring 46a on the mouth 46b and thereby transferred to the means C after the cover 7 has been opened. The final shaping means C includes a finishing bottom mold 53 as attached to the support assembly 24. The finishing mold 25 thereafter closes, and the blow head 28 descends onto the mold 25 to finish the formed piece $46_1$ or parison $46_2$ by blow molding. After the rise of the blow head 28, followed by the opening of the finishing mold 25, the takeout 32 brings the tongs 32c into engagement with the mouth ring 46a and transfers the bottle onto the dead plate 31, from which the bottle is further transferred onto the conveyor 30 by an unillustrated pusher.

When the mouth mold 12 is returned to the parison forming means A in position by the return of the holder 14, the means A forms another parison in the same manner as above. The means B reheats and intermediately forms the parison within a small space confined by the cover 7 over a sufficient period of time until another parison is supplied thereto. Thus the means B sufficiently reheats and intermediately forms the parison to assure a satisfactory finish without reducing the operating speed of the apparatus.

When the parison is likely to inflate excessively, locally or entirely, by being preshaped, the cover 7 may be replaced by a preshaping mold having a surface for restraining the parison from excessive inflation although the mold is not intended to define the shape of preshaping. In the event of excessive bulging, the bulging portion only will then contact the restraining surface. The timing of such contact, and blowing timing and speed can be delayed suitably, whereas the parison nevertheless can be fully reheated over a sufficient period of time. Further even if a mold is used which defines the shape of the workpiece to be preshaped, the parison can be reheated more effectively than heretofore possible.

When bottles 46, formed pieces $46_1$ or parisons $46_2$ are taken out during the bottom forming process by being lifted to a high level and carried over a large distance, the article, when not fully cooled, is likely to spontaneously stretch, bend or otherwise deform at the neck portion between the mouth portion 46b and unsupported body portion due to the weight or inertia of the body portion, since the article is held only at the mouth portion. Even if such deformation is slight, the bottle, while being handled automatically, for example, for filling, will contact another bottle more frequently than is usual or strike the filling head, and is therefore susceptible to damage or break.

This invention has overcome this problem by using the arm-type takeouts 21, 32 which are an improvement over the conventional means. To describe this with respect to the takeout 21, the arm 21b is pivoted at a point $T_1$ below a line L through two points Q and R between which the point P of support of the head 21d on the arm 21b must move for transferring the parison $46_2$ or formed piece $46_1$. Whereas the arm of the conventional means is pivoted at $T_0$ on the line L and is reciprocatingly turnable about the point $T_0$ through an angle of 180 degrees for taking out, the arm 21b is reciprocatingly turnable about the point $T_1$ below the line L through an angle smaller than 180 degrees and therefore has a larger radius of swing for taking out. In this case, the distance $H_1$ of lift of the parison $46_2$ or formed piece $46_1$ is much smaller than the conventional like distance $H_0$, while the distance of movement, i.e. the length of circular arc path of movement, $I_1$, is smaller than the like distance $I_0$ of the conventional means. Accordingly the parison $46_2$ or formed piece $46_1$, which is fully reheated and entirely soft, can be handled without entailing spontaneous stretch, bending or like deformation. This greatly reduces the ratio of rejects. The takeout 32, although having the same construction and feature as above, may be of the conventional construction since the finished bottle to be thereby handled has been cooled considerably. Although the distance $H_1$ of lift of the parison $46_2$ or formed piece $46_1$ for the transfer from the means B to means C is small, a distance S is provided between the guided portions 26a, 26a of the holders 26, as well as between the guide rails 35, 35 therefor, to avoid the interference of such components with the parison $46_2$ or formed piece $46_1$ (see FIG. 2).

What is claimed is:

1. In an apparatus for producing glass bottles including, parison forming means for forming a gob into a parison, the forming means being provided with a parison forming mold openable for taking out the parison, reheating and intermediate forming means for receiving the parison from the forming means and reheating, or reheating and intermediately forming the parison, the reheating means having an intermediate forming member provided for enclosing the parison in a confined space, final shaping means for receiving the reheated parison or intermediately formed piece from the reheating and intermediate forming means and shaping the same into a bottle, the shaping means having a finishing mold openable for removing the bottle, a transfer assembly for transferring the parison from the parison forming means to the reheating and intermediate forming means, a takeout for transferring the reheated parison or intermediately formed piece from the reheating and intermediate forming means to the final shaping means, and a takeout for removing the finished bottle from the final shaping means, the improvement comprising at least said first-mentioned takeout being a rotatably movable arm pivotally mounted on said apparatus, a holder for said parison or formed piece mounted on said arm at a support point, the pivotal axis of said arm being located below a straight line through two points between which said support point of said holder on said arm moves for transferring said parison or formed piece, and means to rotate said arm.

2. An apparatus as defined in claim 1 wherein the transfer assembly comprises an inverting mechanism having a mouth mold holder rotatably mounted at its inner end on said apparatus for rotation through an angle of 180 degrees and provided at its outer end with a mouth mold for forming the mouth of the bottle from the parison including a ring portion, tongs means mounted on said holder for releasably holding the parison or formed piece at its bottle mouth portion comprising, tongs engageable with said ring portion for holding the parison or formed piece in suspension, and said intermediate forming member is openable and formed with a top wall having means thereon engageable with said ring portion to support the parison in suspension when in its closed position and guide recesses for positioning the tongs beneath said ring portion.

3. An apparatus as claimed in claim 2 wherein said two points between which said support point of said holder moves are at the opposite ends of travel of said support point, said holder is pivotably mounted on said arm with the pivotal axis coincident with said support point, said intermediate forming member is a hollow cylinder having a bottom with an integral preshaping bottom mold, and said guide recesses comprise segmental openings in said top wall through which said tongs pass for gripping said ring portion.

* * * * *